Oct. 3, 1967  C. L. WILLIAMS  3,344,769
APPARATUS FOR PAINTING SCREW HEADS
Filed Oct. 24, 1965  2 Sheets-Sheet 1
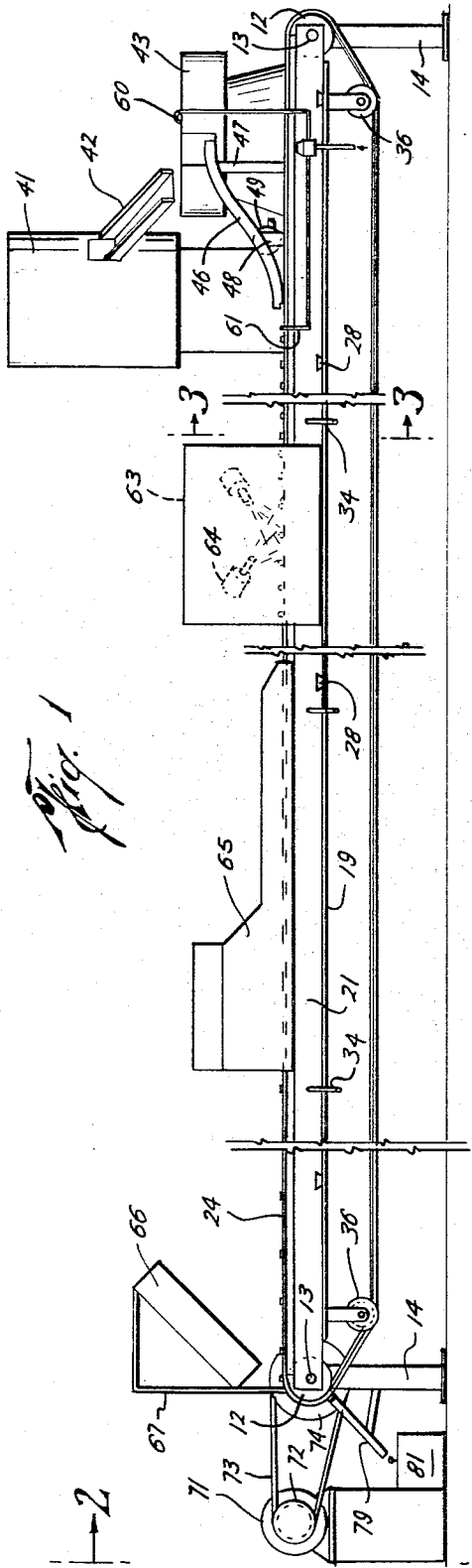
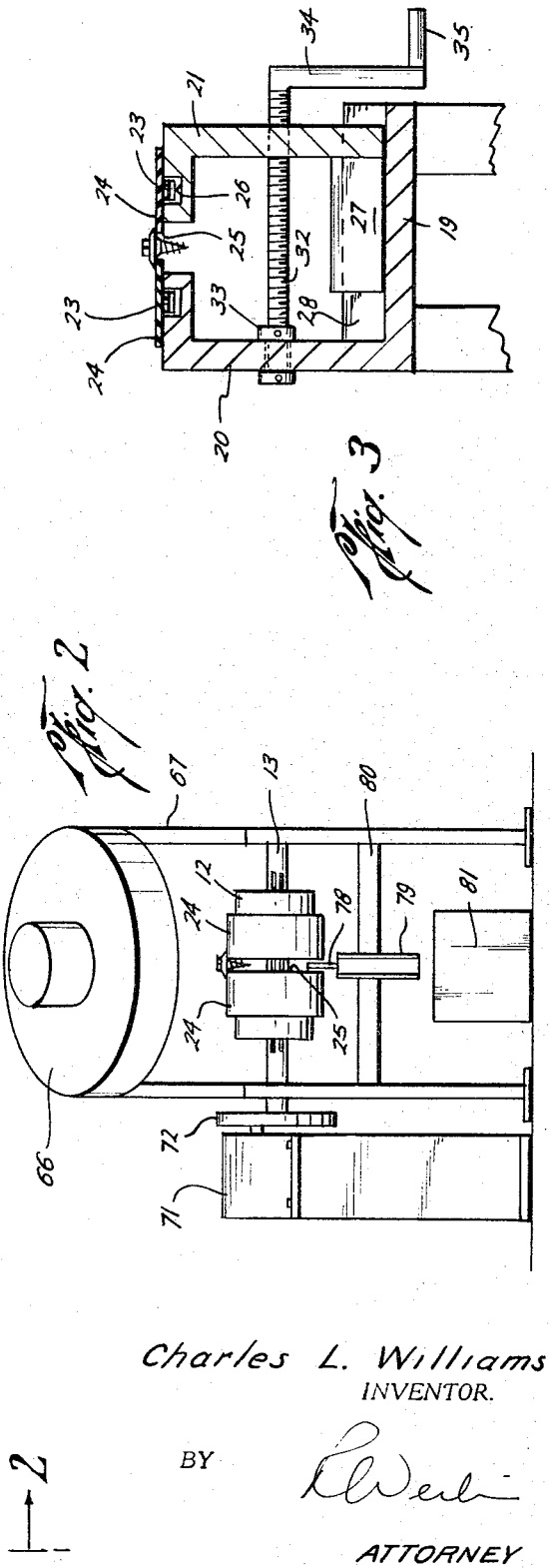
Charles L. Williams
INVENTOR.
BY
ATTORNEY Oct. 3, 1967   C. L. WILLIAMS   3,344,769
APPARATUS FOR PAINTING SCREW HEADS
Filed Oct. 24, 1965   2 Sheets-Sheet 2
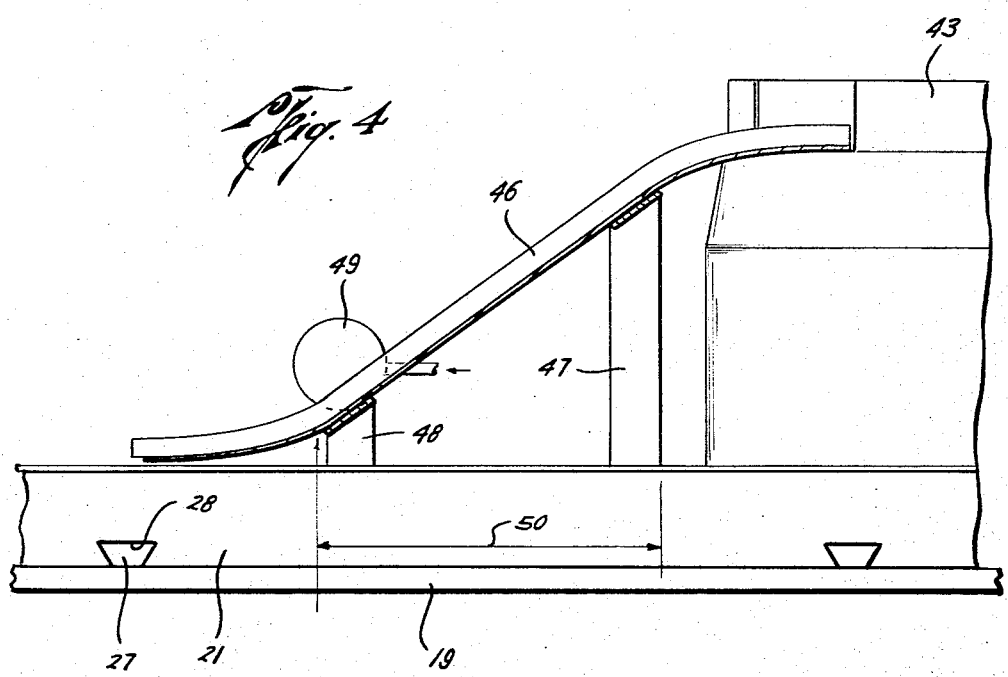
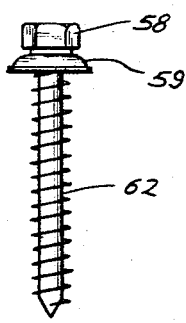
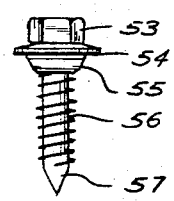
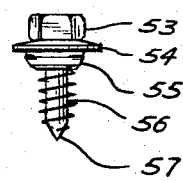
Charles L. Williams
INVENTOR.
BY
ATTORNEY

United States Patent Office 3,344,769
Patented Oct. 3, 1967

3,344,769
APPARATUS FOR PAINTING SCREW HEADS
Charles L. Williams, 9736 Shady Lane,
Houston, Tex. 77016
Filed Oct. 24, 1965, Ser. No. 504,434
10 Claims. (Cl. 118—69)

This invention relates to an apparatus for painting screw heads. More particularly, this invention relates to an apparatus which is particularly useful in painting screw heads in such a manner that the shank and thread portions of the screw remain relatively free of any deposition of paint thereon.

In certain building constructions employing wall and roof panels pre-coated with paint or enamel or the like and which are installed by means of screws connecting sheets or sections of the panel, it is desirable for the sake of appearance as well as for protection against corrosion, that the screw heads be painted in an appropriate color to match the panels with which they are used. It is also desirable that the thread and shank portions of the screw not be painted. As a result, the problem of pre-painting the screw heads has been a difficult and time consuming operation.

It is therefore an object of this invention to provide an improved apparatus for automatically holding and painting screw heads in such a manner that the thread and shank portions of the screw are not painted, which apparatus is both relatively inexpensive and adaptable for a high rate of production.

Briefly stated, the invention herein includes an endless moving belt having a longitudinal slot or space therein which space is dimensioned to accommodate therein the shanks of the screws being painted while the belt is supporting the screw heads thereabove. An inclined trough is provided which is generally longitudinally aligned with respect to the long axis of the belt, with the lower or discharge end of the trough vertically aligned over the space in the belt, whereby screws coming down the trough are deposited into the space in the belt.

Means are also provided for feeding the screws in single file to the top end of the trough. In addition, means are positioned adjacent to the top surface of the belt and near the discharge end of the trough for removing misaligned screws, which means may conveniently take the form of an air jet.

Spray painting means are positioned above the belt and longitudinally spaced apart from the trough means such that the heads of the screws are painted as they pass therebeneath and while being supported by the belt.

While the term "movable belt having a longitudinal space therein" has been used, it is to be understood that that term also includes an arrangement of two belts mounted side by side and forming a space therebetween. In other words, the belt could be in two sections. In certain embodiments of the invention means are provided for adjusting the width of the longitudinal space to accommodate different size screws.

In addition, certain embodiments of the invention may also include heating and cooling means longitudinally spaced along the belt whereby the screws may be first heated and then cooled subsequent to the spraying step. Means may also be provided for removing the screws from the longitudinal space at the discharge end of the belt.

Reference to the drawings will further explain the invention wherein:

FIG. 1 is a side elevation view, partially schematic of an apparatus made in accordance with one embodiment of the present invention.

FIG. 2 is an enlarged end elevation view taken at line 2—2 of FIG. 1.

FIG. 3 is an enlarged cross-sectional view of the belt supporting means taken at line 3—3 of FIG. 1.

FIG. 4 is an enlarged fragmentary side elevation view of the screw trough shown in FIG. 1.

FIGS. 5, 6 and 7 show representative type screws for which the apparatus of the present invention is particularly adaptable for painting the heads thereof.

Referring now to FIGS. 1-3, endless moving flexible belt comprised of two parallel and spaced apart sections 24 is shown supported at each end by belt drums 12 mounted on appropriate shafts 13 which are supported for rotation in the upper end of support braces 14.

Between drums 12 the upper half of belt sections 24 are supported by a belt support assembly which includes base plate 19 connected on one side to fixed side rail 20 and movable side rail 21 on the other. Rails 20 and 21 extend for substantially the full length of belt sections 24.

Referring now to FIG. 3, sections 24 are supported in spaced apart relationship forming longitudinal slot or space 25 therebetween, which space extends for the full length of the belt sections. Each of the belt sections 24 is provided with a continuous row of belt guides 23 which are attached thereto and which fit into longitudinal guide slots 26 formed in the upper flanged surfaces of side rails 20 and 21.

Base plate 19 has secured thereto on the upper side thereof a plurality of keystone shaped cross guides 27 which are accommodated in dovetail shaped guide ways 28 provided in the lower edge of side rail 21.

Side rail 21 is movably mounted with respect to side rail 20 by means of threaded crank pin 32 connected to journal box 33 mounted in side rail 20 at one end and threadably received into side rail 21 at the other end. Crank pin 32 is provided with arm 34 and handle 35. By turning crank pin 32 by operation of handle 35, side rail 21 can be moved relative to side rail 20.

The distance between belt sections 24, and hence, the width of longitudinal space 25 can be adjusted to accommodate screws having shanks with different diameters while still supporting the screw heads thereof on the top portion of the belt sections 24, as shown in FIG. 3.

Referring now to FIG. 1, belt sections 24 are further supported by depending idler wheels 36 which are supported below base plate 19, which completes the belt supporting assembly. It is to be understood that idler wheels 36, as well as belt drums 12, are provided with circumferential slots (not shown) similar to guide slots 26 to accommodate belt guides 23.

Means are also provided for feeding the screws to be painted to slot or longitudinal space 25, which means conveniently takes the form of hopper 41 of conventional design which is adapted to continuously feed a supply of screws down through feed slide 42, into vibrator feeder 43 which is of conventional design. Feeder 43 includes a circular inclined ramp for discharging a single file of the screws to the top end of inclined trough 46 down which the screws slide for deposition into longitudinal space 25.

Trough 46 is supported at its upper end by support brace 47 and at its lower end by support brace 48. Trough 46 is also connected to vibrator 49 which is mounted on support brace 48 and connected to an appropriate source of pressurized air. Vibrator 49 imparts a slight vibration to the slide surface of trough 46.

Trough 46 is generally S-shaped when viewed in side elevation and is generally U-shaped in cross-section, having a width between the side flanges thereof to allow the screw heads to slide freely therealong while preventing the screws from turning sideways. In certain embodiments of the invention the angle of inclination of a section of trough 46 is important. Experimentation has shown that in certain embodiments of the invention it is desirable to have that linear portion of trough 46 indicated by line 50 arranged such that the angle of inclination with respect to the horizontal is approximately 40°. This angle of inclination controls the velocity at which the screws slide downwardly through trough 46, which velocity is most important when handling shorter dimensioned screws, as will be explained hereinafter.

In addition, the cross sectional shape of trough 46 is selected such that the screws passing thereon are maintained in straight alignment and are thus prevented from turning sideways as noted above. This is of particular importance because it is desirable to deliver the screws to longitudinal space 25 in such a manner that the long axes of the screws are aligned with longitudinal space 25.

FIGS. 6 and 7 show screws which are generally described as lag screws, each of which is shown as having a screw head 53, a washer 54 and a resilient grommet 55 supported about threaded shanks 56 which shanks terminate in conical shaped tips 57. FIG. 5 shows another type lag screw having screw head 58, washer 59 and threaded shank 62.

When painting the screw heads of screws of the type and relative dimensions shown in FIGS. 5 and 6, it is not particularly important as to whether or not the screws slide down trough 46 head first or tip first because in either event the screws will be longitudinally aligned with space 25 and will tend to fall into place in longitudinal space 25 in the manner shown in FIG. 3. However, when painting the heads of screws of the relative size and shape as shown in FIG. 7, it is important that the screws slide down trough 46 with the shank point first. This is important because when the shorter screws are discharged from the lower end of trough 46, they tend more often to turn sideways and to become mis-aligned with respect to longitudinal space 25, unless they are fed down trough 46 point first. However, by having the angle of inclination of a portion of trough 46 placed at an angle of approximately 40° with respect to the horizontal, any screws of the type shown in FIG. 7 which start down trough 46 head first will tend to roll and pivot on the edge of washer 54 and thereby rotate approximately 180° such that the screws are fed down trough 46 point first. With longer dimensioned screws, such as those shown in FIGS. 5 and 6, the weight of the shank portion thereof prevent such rotation. But as noted above, screws of longer dimensions are much less likely to turn sideways upon discharge from trough 46.

Jet means are also provided for aligning the screws in slot or space 25, with one air jet 60 directed at the upper end of trough 46 which displaces mis-aligned screws at the head of trough 46 and another air jet 61 mounted to direct a stream of air across the top of belt sections 24 and is spaced adjacent to the lower or discharge end of trough 46 to blow off any screws which are not deposited with the shank portions thereof depending through longitudinal space 25.

After the screws are deposited in longitudinal space 25 with heads exposed, belt sections 24 carry them through painting station 63 where spray nozzles 64, which are mounted over belt sections 24, spray paint downwardly, thus painting only head portions of the screws, and not the shanks and threads, since the latter are protected from exposure by belt sections 24. Moving belt sections 24 then carry the screws through heating station 65 where by means of hot air or other heating medium, the paint is quickly dried on the screw heads, after which the screws are then subjected to a cooling action by operation of fan 66 supported on end braces 67 at the discharge end of the conveyor belt.

It is to be understood that belt sections 24 are powered by conventional means in the form of motor 71 having drive pulley 72 thereof connected to belt 73 which in turn drives pulley 74 connected to one of the shafts 13 which in turn drives the associated belt drum 12.

Referring now to FIGS. 1 and 2 in particular, means are also provided for removing the screws from the longitudinal space 24, which means conveniently take the form of collector pin 78 mounted on the discharge end of the conveyor, which pin projects inwardly into longitudinal space 25 and is supported at its lower end by collecting chute 79 which is supported on cross brace 80 whereby screws are removed from longitudinal slot 25 and deposited via chute 79 to receiver 81.

The screw heads are thus provided with a paint coating while at the same time the shanks and thread portions of the screws are maintained relatively free of paint as is desired. The apparatus permits not only a continuous but very rapid rate of operation which greatly facilitates the screw head painting operation with a minimum of difficulty and cost.

The apparatus is adaptable for painting various size screws because of the adjustable feature of the belt sections 24 to provide a variable width longitudinal space 25. The apparatus has also overcome the problem of handling especially short type screws such as the type shown in FIG. 7 since they are directed down through 46 point first.

Modifications may be made in the invention as particularly described without departing from the scope of the invention. Accordingly the foregoing description is to be construed as illustratively only and is not to be construed as a limitation upon the invention as defined in the following claims.

What is claimed is:

1. An apparatus for painting screw heads comprising:
   an endless moving belt having a longitudinal space therein, the space being dimensioned to accommodate therein the shanks of the screws being painted while the belt is supporting the screw heads thereabove,
   an inclined trough generally longitudinally aligned with the belt with the discharge end of the trough vertically aligned over the space in the belt for depositing the screws thereinto,
   means for feeding the screws in single file to the top end of the trough,
   means positioned adjacent the top of the belt and near the discharge end of the trough for removing mis-aligned screws, and
   means positioned above the belt for spray painting the screw heads while being held by the belt.

2. An apparatus as claimed in claim 1 wherein:
   the means for feeding the screws in single file to the top end of the trough includes a first jet means for removing mis-aligned screws, and
   the means positioned over the belt and adjacent the lower end of the trough for removing mis-aligned screws includes a second jet means.

3. The apparatus as claimed in claim 1 wherein:
   the endless belt is in the form of two sections which are spaced apart to provide the longitudinal space therebetween for supporting the screw heads, and including
   means for adjusting the distance between the two sections to thereby vary the width of the longitudinal space to accommodate different size screws.

4. The apparatus as claimed in claim 1 wherein:
   the inclined trough is generally U-shaped in cross-section and has a linear portion wherein the angle of inclination with respect to the horizontal is approximately 40°.

5. The apparatus as claimed in claim 1 wherein:
   the inclined trough is generally U-shaped in cross-section, is generally S-shaped when viewed in side elevation, is provided with a linear portion wherein the angle of inclination with respect to the horizontal is approximately 40°, and including
   vibration means connected to the trough for facilitating the sliding movement of the screws therein.

6. The apparatus as claimed in claim 1 including:
   heating means longitudinally spaced apart from the means for spray painting the screw heads for applying heat to the screw heads after the painting step, cooling means longitudinally spaced apart from the heating means to cool the screws after the heating step, and means positioned adjacent the discharge end of the belt for removing the painted screws therefrom.

7. An apparatus for painting screw heads comprising in combination:

an endless moving belt having a longitudinal space therein, the space being dimensioned to accommodate therein the shanks of the screws being painted while the belt is supporting the screw heads thereabove, an inclined trough generally U-shaped in cross-section longitudinally aligned with the belt and having the discharge end of the trough vertically aligned over the space in the belt for depositing the screws thereinto, means for feeding the screws in single file to the top of the trough for sliding movement downwardly therein, jet means positioned across the top of the belt and adjacent the lower end of the trough for removing mis-aligned screws from the belt, paint spraying means positioned over the top of belt and longitudinally spaced apart from the trough for painting the screw heads while being supported by the belt, means longitudinally spaced apart from the spray painting means for first heating and subsequently cooling the screw heads after the painting step, and means positioned adjacent the discharge end of the belt for removing the painted screws therefrom.

8. The apparatus as claimed in claim 7 wherein:

the endless belt is in the form of two sections which are spaced apart to provide the longitudinal space therebetween for supporting the screw heads, and including means for adjusting the distance between the two sections to thereby vary the width of the longitudinal space to accommodate different size screws.

9. The apparatus as claimed in claim 7 wherein:

the inclined trough is generally S-shaped when viewed in side elevation and is provided with a linear portion wherein the angle of inclination with respect to the horizontal is approximately 40°, and including vibration means connected to the trough for facilitating the sliding movement of the screws therein.

10. An apparatus for painting screw heads comprising:

an endless moving belt having two generally parallel and spaced apart sections to provide a longitudinal space therebetween to accommodate the shanks of the screws being painted while the belt is supporting the screw heads thereabove, each of said sections having longitudinally extending guide means on the underside thereof;

a pair of parallel guide rails with each member of the pair supporting one section of said belt and each of said guide rails having an upwardly facing longitudinal slot for receiving therein the guide means of said belt section supported thereabove;

means for adjusting the distance between said guide rails, whereby the width of the longitudinal space may be adjusted to accommodate different size screws;

an inclined trough generally longitudinally aligned with the belt and having the discharge end thereof vertically aligned over the space in the belt for depositing the screw shanks thereinto;

means for feeding the screws to the top end of the trough, and means positioned above the belt for spray painting the screw heads while being held by the belt.

References Cited
UNITED STATES PATENTS

| | | | |
|---|---|---|---|
| 1,196,831 | 9/1916 | Yingling | 118—324 X |
| 2,639,445 | 5/1953 | Fray | 221—175 X |
| 2,764,351 | 9/1956 | Broscomb et al. | |
| 2,889,806 | 6/1959 | Conant | 118—69 X |
| 2,948,633 | 8/1960 | Schriner | 118—324 X |
| 3,092,160 | 6/1963 | Hartman. | |
| 3,181,501 | 5/1965 | Dean | 118—70 |

CHARLES A. WILLMUTH, *Primary Examiner.*

R. I. SMITH, *Assistant Examiner.*